(12) United States Patent
Adur et al.

(10) Patent No.: US 11,849,259 B1
(45) Date of Patent: Dec. 19, 2023

(54) ENTERPRISE METAVERSE MANAGEMENT

(71) Applicant: VMWARE, INC., Palo Alto, CA (US)

(72) Inventors: Anoop Adur, Bangalore (IN); Kumar Paritosh, Bangalore (IN); Makrand Sethi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/962,601

(22) Filed: Oct. 10, 2022

(30) Foreign Application Priority Data

Jul. 16, 2022 (IN) .............................. 202241040759

(51) Int. Cl.
*G06F 3/048* (2013.01)
*H04N 7/15* (2006.01)
*H04L 12/18* (2006.01)

(52) U.S. Cl.
CPC .......... *H04N 7/157* (2013.01); *H04L 12/1822* (2013.01)

(58) Field of Classification Search
CPC ............................. H04N 7/157; H04L 12/1822
See application file for complete search history.

(56) References Cited

U.S. PATENT DOCUMENTS

| | | | | |
|---|---|---|---|---|
| 10,303,497 B2* | 5/2019 | Abiezzi | ................ | G06T 15/005 |
| 10,609,437 B2* | 3/2020 | Kubo | ...................... | G06F 1/163 |
| 10,750,404 B2* | 8/2020 | Misra | .................... | H04W 24/08 |
| 10,860,704 B1* | 12/2020 | Edwards | ................ | G06V 20/20 |
| 10,955,662 B2* | 3/2021 | Singh | ...................... | G06F 21/44 |
| 10,958,639 B2* | 3/2021 | Toth | ........................ | G06F 1/163 |
| 11,122,423 B2* | 9/2021 | Stuntebeck | ........... | H04W 12/72 |
| 11,150,788 B2* | 10/2021 | Timonen | ............... | G06F 3/0484 |
| 11,170,091 B2* | 11/2021 | Gu | ........................ | H04W 12/06 |
| 2008/0075118 A1* | 3/2008 | Knight | ................ | H04L 12/1822 370/474 |
| 2011/0099608 A1* | 4/2011 | Queck | ................. | G06F 21/6209 718/1 |
| 2011/0161834 A1* | 6/2011 | Shadfar | ................. | H04L 67/131 715/753 |
| 2011/0231434 A1* | 9/2011 | Tabata | ................... | G06N 3/006 707/769 |

(Continued)

FOREIGN PATENT DOCUMENTS

| WO | WO-2018152455 A1 * | 8/2018 | ............. G06F 3/011 |
|---|---|---|---|
| WO | WO-2019040065 A1 * | 2/2019 | ........... A63F 13/352 |
| WO | WO-2020122744 A1 * | 6/2020 | |

*Primary Examiner* — Rashawn N Tillery
(74) *Attorney, Agent, or Firm* — Clayton, McKay & Bailey, PC

(57) ABSTRACT

Examples described herein include systems and methods for managing user interaction within a virtual space. An example method can include installing management software on one or more user devices and requesting a digital ID that represents a combination of a user and at least one user device. The method can further include configuring a virtual reality ("VR") space including virtual meeting rooms and a notification service. An administrator can set the number of rooms, place virtual objects within each room, and set requirements for entering each room based on the digital IDs. The administrator can also configure a notification service to provide guided notifications to users during their VR experiences. For example, the notification service can utilize the digital ID to identify the appropriate instructions to provide to the user as they are navigating the VR space.

20 Claims, 5 Drawing Sheets

(56) References Cited

U.S. PATENT DOCUMENTS

| | | | | |
|---|---|---|---|---|
| 2014/0337634 | A1* | 11/2014 | Starner | H04W 12/33 |
| | | | | 713/186 |
| 2015/0332387 | A1* | 11/2015 | Stacey | H04L 67/02 |
| | | | | 705/27.2 |
| 2016/0100015 | A1* | 4/2016 | Levy | H04L 67/56 |
| | | | | 709/227 |
| 2016/0337351 | A1* | 11/2016 | Spencer | H04L 63/0876 |
| 2020/0092374 | A1* | 3/2020 | Mehta | G06F 11/0793 |
| 2021/0234847 | A1* | 7/2021 | MacDonald | H04L 63/065 |
| 2021/0349322 | A1* | 11/2021 | Harris | G02B 27/0176 |
| 2021/0400055 | A1* | 12/2021 | Vitale | H04L 63/0876 |
| 2021/0406841 | A1* | 12/2021 | Chen | G16H 40/20 |
| 2023/0139813 | A1* | 5/2023 | Thiel | G06F 21/31 |
| | | | | 726/7 |

\* cited by examiner

ENTERPRISE METAVERSE MANAGEMENT

RELATED APPLICATIONS

Benefit is claimed under 35 U.S.C. 119(a)-(d) to Foreign Application Serial No. 202241040759 filed in India entitled "ENTERPRISE METAVERSE MANAGEMENT", on Jul. 16, 2022, by VMware, Inc., which is herein incorporated in its entirety by reference for all purposes.

BACKGROUND

Many enterprises use email, printed materials, or in-person meetings as the primary mechanisms for disseminating enterprise information. For example, a new hire at an enterprise might attend an in-person meeting for new hires, receive a pamphlet of enterprise conduct rules, and receive one or more emails detailing their job responsibilities. But with remote work gaining in popularity, enterprises need new ways to allow their employees to gather, share information, and communicate. A geographically dispersed team of employees may not be able to meet in person, and email is not the most efficient mechanism for these employees to collaborate.

Videoconference platforms have filled in some of the gaps, allowing a geographically dispersed team to see and speak to each other. But these platforms have various limitations, such as requiring expensive licenses, the use of third-party servers that may not be secure, planning and scheduling for each meeting, and authentication issues. Regarding authentication, an enterprise may be able to limit a videoconference meeting to individuals who possess a link or a passcode, but these methods are ultimately not secure. The link or passcode could be shared with unwanted participants, for example. And there is no way for an organization to determine that a device or user connecting to the meeting is the intended device or user.

The metaverse can offer technological improvements to the way that enterprises communicate with employees and the way that employees communicate with one another. The term "metaverse" is notoriously varied in definition, but for the purpose of this disclosure is intended to encompass virtual reality, augmented reality, and mixed reality spaces. Virtual reality generally refers to a fully computerized space, augmented reality refers to digital content overlaid into a real-world environment, and mixed reality refers to a combination of the two. For convenience, in this disclosure the term "virtual reality" or "VR" is used to encompass all of these possibilities.

While virtual reality products exist today in some form, they have not been leveraged by enterprises to improve the way employees interface within the enterprise. Enterprises require additional features, such as security and management controls, relative to a publicly available product. As a result, a need exists for systems and methods for managing user interaction within a virtual space.

SUMMARY

Examples described herein include systems and methods for managing user interaction within a virtual space. An example method can include installing a management profile on a first device, such as a user's primary computing device. The profile can include various rules that can be enforced by a management application executing on the device. The method can include the user scanning a second device, such as a VR headset, using the camera function on the first device. Based on the scanning, the first device can cause the second device to be registered at a management server. The first device or management server can also install a profile on the second device, enabling management control of that device.

The example method can also include requesting a digital ID from the management server, which can be used to control entry into various VR spaces associated with the enterprise. The management server can authenticate the user and their associated devices, and generate a digital ID. In some examples, the digital ID represents a combination of the user, the first device, and the second device, such that all elements of the combination must be present to utilize the digital ID. This can ensure that users entering a particular VR space are using approved VR devices and are authorized users. The digital ID can be stored at the first device, second device, or both devices.

The example method can further include configuring the VR space as well as a notification service. The VR space can include, for example, one or more meeting rooms and a gathering space outside the meeting rooms, which users can utilize for moving between rooms or for communicating with other users in the area. An administrator can configure the VR space by, for example, selecting a number of virtual meeting rooms, selecting or designing virtual objects within each virtual meeting room, setting requirements for entering each virtual meeting room, and setting timers on virtual meeting rooms or on digital IDs.

The administrator can also configure a notification service to provide guided notifications to users during their VR experiences, as well as notifications informing users that the VR experience is available for use. For example, the notification service can be configured to generate a notification informing the user that their presence is requested in a virtual meeting room along with the meeting start time. When the user enters the VR space, the notification service can generate a notification that guides the user to the correct virtual meeting room. The notification service can utilize the digital ID to authenticate a user and their devices, and to identify the appropriate instructions to provide to the user as they are navigating the VR space.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for managing user interaction within a virtual space. This can include installing management software on one or more user devices and requesting a digital ID that represents a combination of a user, a user device, and a VR device. The method can further include configuring a VR space, including virtual meeting rooms and a notification service. An administrator can set the number of rooms, place virtual objects within each room, and set requirements for entering each room based on the digital IDs. The administrator can also configure a notification service to provide guided notifications to users during their VR experiences. For example, the notification service can utilize the digital ID to identify the appropriate instructions to provide to the user as they are navigating the VR space.

Figure 1:
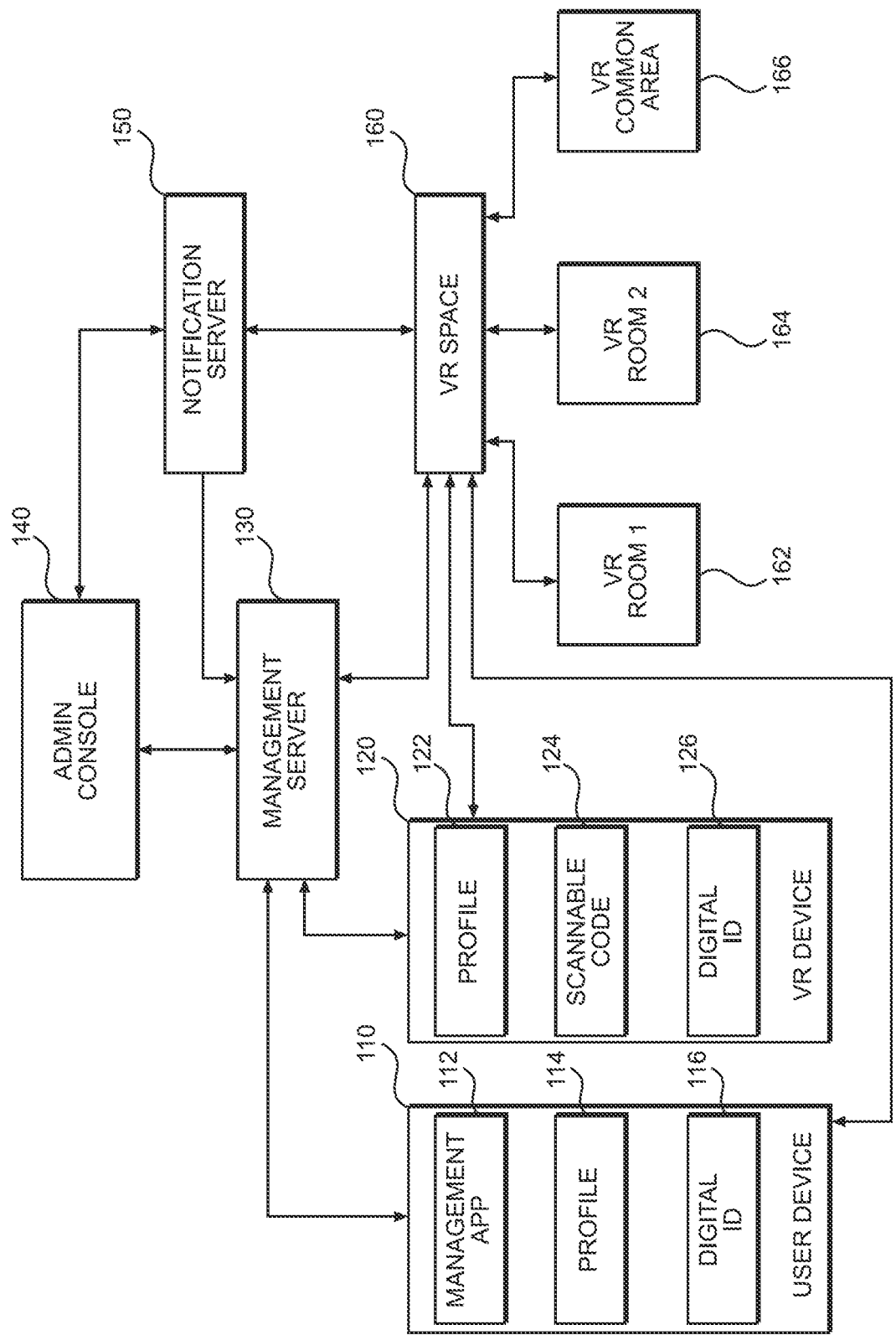
FIG. 1 is an illustration of an example system for managing user interaction within a virtual space.

FIG. 1. provides an illustration of a system for managing user interaction within a virtual space. This example system includes two user-based devices, shown as a user device 110 and a VR device 120. The user device 110 can be any type of hardware-processor-based device, such as a smartphone, tablet, desktop computer, or laptop computer. The VR device 120 can be any device capable of displaying virtual-reality elements and allowing some sort of user feedback. For example, the VR device 120 can be a headset, which can be a device configured to be worn on a user's head and include at least one display. The VR device 120 can include two displays corresponding to the user's two eyes, or one display viewable through both of the user's eyes. The VR device 120 can also include one or more speakers that play sound near the user's ear. In some examples, the VR device 120 includes peripheral devices, such as one or more controllers, joysticks, or other devices that can accept inputs from the user. The peripheral devices can also include devices intended to track a user's movements, such as a floor pad that tracks a user's steps, a heartrate monitor, or motion sensors. In some examples the VR device 120 can be a smartphone, tablet, or computer.

Many of today's VR devices are generally incapable of being managed directly by an enterprise, such as by being enrolled into a management system. This is because most VR devices do not use a robust operating system such as the type a typical smartphone would use, and therefore cannot interact in the same way with a management server. While this is not necessarily true in all cases, the system of FIG. 1 is described in a way that accounts for the VR device 120 not being able to enroll directly.

The user device 110, on the other hand, can enroll with a management server 130 shown in FIG. 1. The management server 130 can be responsible for enrolling devices and managing devices that are enrolled in the system. The management server 130 can be a single server or a group of servers, including multiple servers implemented virtually across multiple computing platforms. The management server 130 can manage the user device 110 by sending management instructions to a management application 112 installed on it. The management application 112 can be a stand-alone application, part of an enterprise application, or part of an operating system of the user devices 110.

The management application 112 can be downloaded and installed at the user device 110 prior to, or as part of, the enrollment process. For example, a user can download the management application 112 using a uniform resource locator ("URL") that points to a content delivery server with an installation file for the management application 112. The URL can be provided by the enterprise, for example. Alternatively, the user can download the management application 112 from an app store, such as APPLE's APP STORE or GOOGLE PLAY. When the user launches the management application 112 for the first time, the management application 112 can prompt the user to enter authentication credentials, such as a username and password or a one-time password ("OTP") provided to the user by the enterprise. The management application 112 can send the user-provided credentials to the management server 130 in an encrypted format.

If the management server 130 can authenticate the credentials, then the management server 130 can begin provisioning the user device 110 for enterprise management. For example, the management server 130 can send a management profile 114 to the management application 112. The management profile 114 can include compliance and security settings assigned to the user's profile and any user groups that the user is assigned to. The management server 130 can also send a security certificate associated with the user's profile 114 that can be used at the user device 110 to access enterprise data and resources, including managed applications. A managed application is an application that allows control of access and functionality by the UEM system. The management server 130 can provision managed applications assigned to the user or the management profile 114. For example, the management server 130 can provide the management application 112 with installation files or URLs for retrieving the installation files for managed applications.

The management application 112 can configure the user device 110 using the management profile 114. For example, the management application 112 can install compliance and security settings from the management profile. As an example, the management application 112 can encrypt all or a portion of the user device's hard drive, apply virtual private network ("VPN") settings for accessing UEM data and resources, and set device access controls (e.g., password or personal identification number ("PIN") requirements). The management application 112 can also install and configure managed applications for the user device 110.

After enrollment is complete, the system can actively manage the user device 110 by sending, via the management server 130 or another server in the system, management commands, including any updated compliance and security settings, to the management application 112. The management application 112 can ensure that the user device 110 is up to date with the compliance and security settings prior to allowing access to enterprise data and resources. For example, the management application 112 can analyze the device state of the user device 110 using rules included in the management profile.

The device state can include various aspects of the user device 110, such as the device 110 manufacturer, model, and ID, a current battery charge level, whether the device 110 is jailbroken, OS type and version, geographic location, a login status of the user, and an identification of the applications installed on the device 110. The user device 110 can provide periodic updates of its state information to the management server 130. These updates can provide a full list of the various device aspects in one example, but in another example each update can identify changes from the previous device status update.

The management server 130 can send management commands to the management application 112 using any available communication protocol or channel. For example, the management server 130 can send management commands using an application programming interface ("API"), a notification system, a messaging system native to the user device 110, or a command queue. In one example using a command queue, the management server 130 can store one or more commands in a queue that is available to the user device 110 over a network. The commands can encompass any management action, such as instructing the user device 110 to download an application, report a device state, or apply a new profile. The management system can alert the user device 110 to a change in the command queue, such as by sending a notification to the user device 110 instructing the device to access the command queue. The notification can be sent through the management application 112 in some examples, but can also be sent as an OS-level notification or a message that utilizing an OS messaging scheme, such as a Short Message Service ("SMS") message.

The management application 112 can be responsible for ensuring that the user device 110 is up to date with compliance and security settings prior to accessing enterprise data and resources. The management application 112 can communicate with the management server 130, allowing management of the user device 110 based on compliance and security settings at the management server 130. The management application 112 can enforce compliance at the user device 110 such as by locking a device, notifying an admin, or wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the user device 110 can access enterprise or UEM resources through the management server 130.

The management server 130 can also generate a digital ID 116 for the user device 110 and provide it for storage on the user device 110. Before generating the digital ID 116, the management server 130 can authenticate the user and the user device 110, such as by confirming compliance settings through the management application 112 and requesting an authentication certificate or token from the user device 110. In some examples, the user can also be asked to reauthenticate themselves to the management server 130. The management server 130 can then generate the digital ID, storing information associating the digital ID 116 with the user, the user device 110, the VR device 120, or a combination of the three. If the user has other enrolled devices or VR devices, the digital ID 116 can apply to those devices as well. The digital ID 116 can be used within a VR space 160 as described later in this disclosure.

The user device 110 can perform various stages for onboarding the VR device 120. In an example where a VR device 120 is not capable of full enrollment with the management server 130, the user can manually onboard the VR device 120. In one example, the VR device 120 includes a scannable code 124, such as a quick response ("QR") code or a bar code, which can be affixed to the VR device 120 or associated packaging. The user can then utilize a camera function of the user device 110 to scan the code 124. This can provide the user device 110 with various information, such as the device name, device type, model number, operating system, and hardware specifications of the VR device 120. This information can be gathered by the management application 112 or stored in a location accessible to the management application 112.

In some examples, the profile 114 on the user device 110 authorizes the user device 110 to provision a profile 122 to the VR device 120. For example, the profile 114 can include rules for determining which types of devices are authorized for direct profile provisioning. As an example, the profile 114 can specify that if the VR device 120 is a device type on a list of device types that are known to not be able to interface directly with the management server 130, then the management application 112 on the user device 110 is authorized to provision a profile 122 to the VR device 120. In another example where the VR device 120 can sufficiently interface with the management server 130, the management server 130 can provision the profile 122 directly to the VR device 120.

The profile 122 provisioned to the VR device 120 can be a VR profile that differs from the profile 114 provisioned to the user device 110. For example, the VR profile 122 can include a shorter, or at least different, list of attributes required for compliance. The VR profile 122 can also link the VR device 120 to a master device, such as the user device 110.

The VR device 120 can also store a digital ID 126. In some examples, the digital ID 126 of the VR device 120 is the same as the digital ID 116 of the user device 110. As an example, if the digital ID 116 of the user device 110 is obtained after scanning the code 124 of the VR device 120, then the management server 130 can account for the VR device 120 when generating the digital ID 116, in which case the same digital ID can be used for the digital ID 126 of the VR device 120. This can occur in a situation where, for example, the digital ID 116, 126 is an ID unique to the combination of the user, the user device 110, and the VR device 120. In another example, the user device 110 modifies the digital ID 116 to obtain a different digital ID 126 that it provisions to the VR device 120. This can be used in a situation where, for example, the VR device 120 only needs a truncated version of the digital ID 116 in order to navigate the VR space 160, as described further below.

The system can also include an administrator ("admin") console 140. The admin console 140 can be web portal accessible through a browser, where the web portal interfaces with the management server 130 and allows an admin to control various aspects of the system. The admin console 140 can also be an application executing on an admin device, or dedicated device such as a kiosk. An admin can use the admin console 140 to provide instructions to the management server 130 for managing the user device 110 and VR device 120, in one example. The admin can use the admin console 140 to establish rules for providing profiles 114, 112 to the devices 110, 120 and for generating digital IDs 116, 126. For example, the admin can establish a rule that when a digital ID 116 is provisioned to a user device 110, the management server 130 informs the management application 112 on the user device 110 that the user device 110 is authorized to share the digital ID 116 with the VR device 120 after scanning the code 124.

Digital IDs 116, 126 can be configured and managed by the management server 130. In some examples, digital IDs 116, 126 include timers that define the time period during which the digital ID 116, 126 remains valid. When the timer expires, the digital ID 116, 126 can expire as well, prompting the user device 110 or VR device 120 to request a new digital ID 116, 126. This can ensure that the user device 110 and VR device 120 stays compliant and up-to-date when using enterprise resources in the VR space 160, and can also account for changes relevant to a user such as moving to a new user group within the enterprise, leaving the enterprise, or getting a new device.

The admin console 140 can also be used to configure a notification server 150. The notification server 150 can provide notifications to a user in a variety of ways, such as within the VR space 160, through the management server 130, or directly to the user device 110 or VR device 120 (not shown). Through the admin console 140 or management server 130, an admin can configure the types of notifications and rules for sending those notifications, particularly relating to notifications relevant to the VR space 160 and the VR device 120. For example, the notification server 150 can be configured to notify a user, at the first user device 110, that access to the VR space 160 has been granted to the user or to a device 110, 120 of the user. While the user is in the VR space 160, such as by utilizing the VR device 120, the notification server 150 can generate notifications that appear within the VR space 160, as described in more detail below.

The VR space 160 can be considered part of the system of FIG. 1 in some examples. The VR space 160 can include any computerized, digital, or digitally augmented environment. In one example, the VR space 160 is a computerized digital area within which a user can move freely using an avatar that represents the user. As an example, the VR space 160 can include a VR common area 166, such as a large room, lobby, building, or open space. Within the VR common area 166, a user can utilize the VR device 120 to cause their avatar to move and to view other avatars corresponding to other users within the area 166. The VR space 160 can also include various VR rooms 162, 164, which can be dedicated places within the VR space 160 for meetings or other events.

In some examples, an admin can establish different criteria for entering the VR common area 166 and various VR rooms 162, 164. For example, the VR common area 166 can be open to all users with a valid digital ID 126, while a first VR room 162 can be closed except for users with a particular subset of digital IDs 126. This could be useful if a VR room 162, 164 is being used for a confidential meeting or a meeting that only applies to a certain user group. As an example, if a financial meeting is being held in VR room 162, then the admin can establish a rule that only users with a digital ID 116, 126 corresponding to accounting and finance user group can enter the VR room 162 during the meeting time.

The VR space 160 can run on one or more servers. The servers can be physical servers owned and operated by the enterprise for security purposes, or they can be cloud servers in a virtualized or software-defined datacenter. In some examples, the VR space 160 can utilize a mix of server types, relying on cloud servers for the VR common area 166 and one or more VR rooms 162, 164, while other VR rooms 162, 164 to be used for more sensitive communications are hosted on a secure server located on the enterprise premises for security purposes.

Figure 2:
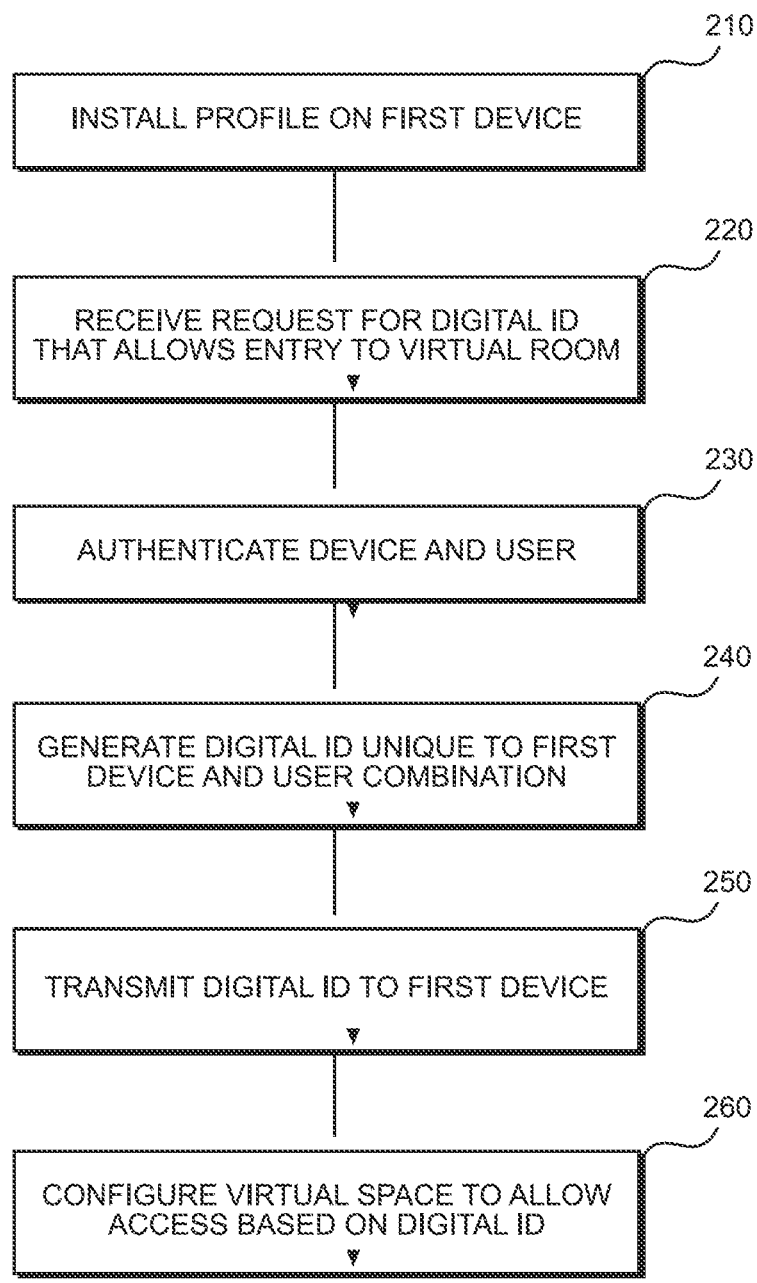
FIG. 2 is a flowchart of an example method for managing user interaction within a virtual space.

FIG. 2 provides a flowchart of an example method for managing user interaction within a virtual space 160. At stage 210, a profile 114 can be installed on a first device, such as the user device 110 of FIG. 1. The profile 114 can be generated by the management server 130 and provisioned to the device 110, either by transferring directly or by instructing the device 110 to retrieve the profile 114 from a command queue. The profile 114 can include compliance and security settings assigned to the user's profile and any user groups that the user is assigned to. A management application 112 executing on the device 110 can configure the device 110 using the profile 114, as explained previously.

At stage 220, the management server 130 can receive a request for a digital ID 116 that allows entry to a VR space 160, VR room 162, 164, or VR common area 166. The request at stage 220 can be sent by the user device 110. The request can include authentication information, such as a certificate or profile stored at the user device 110 indicating that the user or user device 110 has been authenticated previously by the management server 130. The request can also include information about the user device 110, such as a device type, operating system type and version, geographic location, and compliance status.

In some examples, the request at stage 220 also includes information about a VR device 120. This can allow the management server 130 to process the request based on information about both the user device 110 and the VR device 120, rather than just the user device 110, as explained in more detail with respect to the example shown in FIG. 3 and discussed in more detail below.

At stage 230, the management server 130 can authenticate the user device 110 and the user. Authentication at this stage can include confirming compliance of the user device 110 and, if relevant, compliance of the VR device 120 as well. Authentication can also include confirming the validity of a token or certificate provided by the user device 110 as part of the request in stage 220. In some examples, the request includes information about the VR space 160 or particular VR rooms 162, 164. The management server 130 can then confirm, as part of stage 230, that the user is authorized to access the requested space. For example, the request can identify a particular VR room 162, 164 that requires a user to belong to a particular user group in order to enter. As an example, the VR room 162, 164 can be a room for hosting board meetings, where only high-level executives or current board members are allowed entry. The management server 130 can access a stored record indicating all user groups to which the user belongs, and if the user does not belong to the relevant user group, the management server 130 can deny access partially or entirely.

In one example, stage 230 includes partially authenticating the user for access to only limited areas within the VR space 160. If the user is a new hire, for example, the user can be authenticated only for purposes of entering a VR common area 166 and a VR room 162 specific to new hires.

At stage 240, the management server 130 can generate a digital ID unique to the user and user device 110. The digital ID can be used to implement the authentication, or partial authentication, from stage 230. For example, the digital ID can include a portion indicating which areas within the VR space 160 a user is allowed to visit. The digital ID can include a sub-string that provides such an indication. For example, the sub-string can include a "100" representing access to all of the VR space 160, a "101" representing access to the VR space 160 but not to a particular VR room 162, 164, a "102" representing access to a VR room 162, 164 but not to a VR common area 166, and so on. Any combination of characters can be used in the sub-string, and any portion of the VR space 160 can be implicated by those combinations of characters. The management server 130 can store a master list of sub-strings and corresponding access levels, which can be implemented to allow or block entry to the user in later stages of the method.

The management server 130 can generate the digital ID based on the user information alone in some examples. In other examples, such as that illustrated in FIG. 2, the management server 130 can generate the digital ID based on a combination of the user and user device 110. In this manner, the digital ID can be unique to the combined user and user device 110, such that the digital ID would not be valid if the user was using a different device instead of the user device 110. In some examples, as discussed with respect to FIG. 3, the digital ID is specific to the user and multiple devices, such as the user device 110 and VR device 120. In those examples, the digital ID is only valid when the user is logged in to both the user device 110 and VR device 120. This can ensure that a user is utilizing proper VR equipment before attempting to enter a VR space 160 that requires the use of such equipment, such as a VR meeting that requires VR interaction.

At stage 250, the management server 130 can transmit the digital ID to the user device 110. The user device 110 can store the digital ID for use when accessing the VR space 160. In some examples, this stage can also include transmitting a digital ID to the user's VR device 120, which is described in more detail with respect to the example of FIG. 3 included below.

At stage 260, the management server 130 can configure the VR space 160 to allow access based on the digital ID. For example, the management server 130 can add the digital ID to a list of digital IDs that are allowed to enter the VR space 160. As described earlier, the management server 130 can configure access on a more granular level as well. For example, the management server 130 can maintain multiple lists corresponding to different levels of access. A first list can include access to only the VR common area 166 but no VR rooms 162, 164. In an example where a user is only allowed to access the VR common area 166, the management server 130 can update a list associated with the VR common area 166 to include the digital ID from stage 250.

Figure 3:
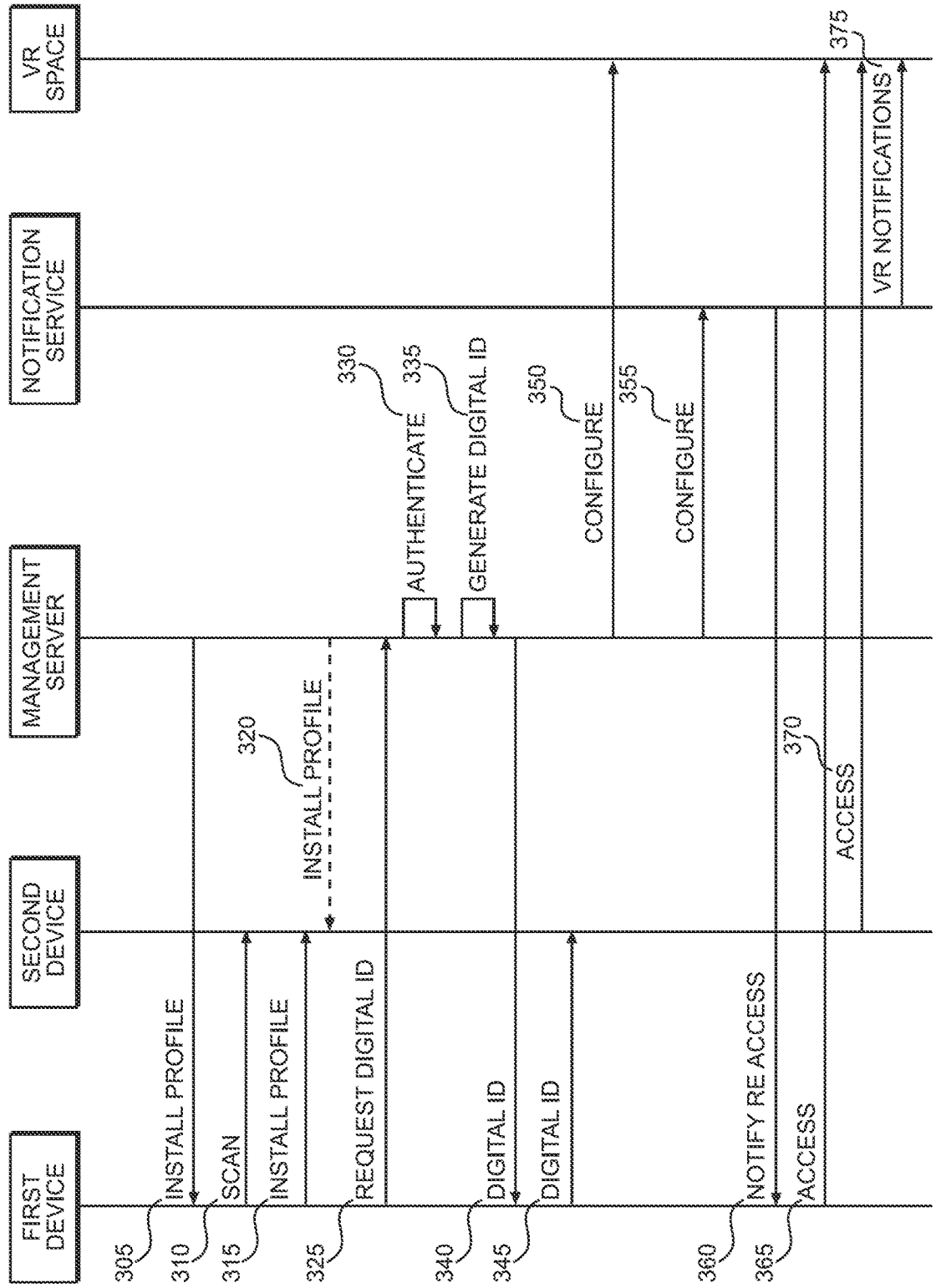
FIG. 3 is a sequence diagram of an example method for managing user interaction within a virtual space.

FIG. 3 provides a sequence diagram of an example method for managing user interaction within a virtual space, where the example includes a first and second device of a user (corresponding to the user device 110 and VR device of FIG. 1, respectively). At stage 305, the management server 130 can cause the first device to install a profile 114. The profile 114 can be generated by the management server 130 and provisioned to the device 110, either by transferring directly or by instructing the device 110 to retrieve the profile 114 from a command queue. The profile 114 can include compliance and security settings assigned to the user's profile and any user groups that the user is assigned to. A management application 112 executing on the device 110 can configure the device 110 using the profile 114, as explained previously.

At stage 310, the first device 110 can scan a code 124 of the second device 120. For example, the user can utilize a camera function of the first device 110 to scan the code 124, which can be a QR code, bar code, or other code affixed to the second device 120. This can provide the first device 110 with various information, such as the device name, device type, model number, operating system, and hardware specifications of the second device 120. This information can be gathered by a management application 112 stored on the first device 110 or stored in a location accessible to the management application 112.

In some examples, such as the one depicted in FIG. 3, the profile 114 on the first device 110 can authorize the device 110 to provision a profile 122 to the second device 120 at stage 315. For example, the profile 114 can include rules for determining which types of devices are authorized for direct profile provisioning. As an example, the profile 114 can specify that if the second device 120 is a device type on a list of device types that are known to not be able to interface directly with the management server 130, then the management application 112 on the first device 110 is authorized to provision a profile 122 to the second device 120.

In another example where the second device 120 can sufficiently interface with the management server 130, the management server 130 can provision the profile 122 directly to the second device 120, as indicated by the optional stage 320 depicted in FIG. 3.

The profile 122 provisioned to the second device 120 can be a VR profile that differs from the profile 114 provisioned to the first device 110. For example, the VR profile 122 can include a shorter, or at least different, list of attributes required for compliance. The VR profile 122 can also link the second device 120 to a master device, such as the first device 110 or another device owned by the user.

At stage 325, the first device 110 can request a digital ID from the management server 130. The request can include authentication information, such as a certificate or profile 114 stored at the first device 110 indicating that the user or first device 110 has been authenticated previously by the management server 130. The request can also include information about the user device 110, such as a device type, operating system type and version, geographic location, and compliance status. The request at stage 325 can also include information about the second device 120, such as at least some of the information obtained from scanning the code 124 of the second device 130 at stage 310. This can allow the management server 130 to process the request based on information about both the first device 110 and the second device 120, rather than just the first device 110. In some examples, the request at stage 325 can be for a single digital ID that can be shared by both the first and second devices 110, 120. In another example, the request can be for two digital IDs, one for each of the first and second devices 110, 120.

At stage 330, the management server 130 can authenticate 330 one or more of the user, first device 110, and second device 120. Authentication at this stage can include confirming compliance of the first device 110 and, if relevant, compliance of the second device 120 as well. Authentication can also include confirming the validity of a token or certificate provided by the first device 110 as part of the profile provisioning in stage 305. In some examples, the request includes information about the VR space 160 or particular VR rooms 162, 164. The management server 130 can then confirm, as part of stage 330, that the user is authorized to access the requested space. For example, the request can identify a particular VR room 162, 164 that requires a user to belong to a particular user group in order to enter. As an example, the VR room 162, 164 can be a room for hosting board meetings, where only high-level executives or current board members are allowed entry.

The management server 130 can access a stored record indicating all user groups to which the user belongs, and if the user does not belong to the relevant user group, the management server 130 can deny access partially or entirely. On the other hand, if the user belongs to the relevant user group, the management server 130 can confirm access. In one example, stage 330 includes partially authenticating the user for access to only limited areas within the VR space 160. If the user is a new hire, for example, the user can be authenticated only for purposes of entering a VR common area 166 and a VR room 162 specific to new hires.

At stage 335, the management server 130 can generate one or more digital IDs 116, 126. If the request at stage 325 was for a single digital ID to be shared between the first and second devices 110, 120, then stage 335 can include generating a single digital ID. If the request was for separate digital IDs for the first and second devices 110, 120, then stage 335 can include generating two digital IDs 116, 126 for the first and second devices 110, 120, respectively.

Each digital ID can be used to implement the authentication, or partial authentication, from stage 330. For example, the digital ID 116, 126 can include a portion indicating which areas within the VR space 160 a user is allowed to visit. The digital ID 116, 126 can include a sub-string that provides such an indication. For example, the sub-string can include a "100" representing access to all of the VR space 160, a "101" representing access to the VR space 160 but not to a particular VR room 162, 164, a "102" representing access to a VR room 162, 164 but not to a VR common area 166, and so on. Any combination of characters can be used in the sub-string, and any portion of the VR space 160 can be implicated by those combinations of characters. The management server 130 can store a master list of sub-strings and corresponding access levels, which can be implemented to allow or block entry to the user in later stages of the method.

The different digital IDs 116, 126 can include different sub-strings. For example, a user may be permitted to view a VR common area 166 using the first device 110, but not permitted to enter a VR room 162, 164 using only the first device 110. This could allow a user without a VR device to experience the VR common area 166, but not participate in a VR room 162, 164 for example. Extending that example, the VR room 162, 164 can require a sub-string unique to a digital ID 126 associated with the second device 120, which is a VR device in this example. The management server 130 can then update the relevant VR server(s) to allow the access to the VR rooms 162, 164 based on the digital ID 126.

In other examples, the management server 130 can generate the digital ID based on a combination of the user, first device 110, and second device 120. In this manner, the digital ID can be unique to the combined user and devices 110, 120, such that the digital ID would not be valid if the user was using a different combination of devices instead of the first and second device 110, 120. In those examples, the digital ID 116, 126 is only valid when the user is logged in to both the user device 110 and VR device 120. This can ensure that a user is utilizing proper VR equipment before attempting to enter a VR space 160 that requires the use of such equipment, such as a VR meeting that requires VR interaction. In that example, because the digital ID 116, 126 accounts for both devices 110, 120, the devices 110, 120 can share the same digital ID 116, 126.

At stage 340, the first device 110 can receive the digital ID 116, 126 from the management server 130. As discussed above, the digital ID 116, 126 can be a single ID that incorporates the combination of both devices 110, 120, or it can be two different digital IDs 116, 126, each corresponding to one of the devices 110, 120. In either case, at stage 345, the first device 110 can transmit a digital ID 126 to the second device 120, regardless of whether that digital ID 126 is the same or different from the other digital ID 116.

At stage 350, the management server 130 can configure the VR space 160. Configuring the VR space 160 can include various steps. For example, it can include updating one or more list of digital IDs 116, 126, such as lists associated with different VR rooms 162, 164, VR common area 166, or other VR spaces within the larger VR space 160. These lists can be used to control access to the various areas within the VR space 160.

The configuration at stage 350 can also include configuring aspects of the VR space 160 itself. For example, an admin can configure the number of discrete spaces within the VR space 160. Using the example of FIG. 1, the VR space 160 can include a first VR room 162, a second VR room 164, and a VR common area 166. But any number of areas can be configured at this stage. Additionally, each area can be a different size with a different maximum number of users that can be in the area at any given time. Beyond that, the look and feel of each area can be configured as desired by an admin. In one example, the VR common area 166 is configured to look like an actual lobby of the enterprise building. In another example, the VR common area 166 is configured to look like an upscale hotel lobby. In yet another example, the VR common area 166 is a large grassy field. Similarly, the VR rooms 162, 164 can be configured in various ways. To give a few examples, the VR rooms 162, 164 can be configured to display enterprise-themed logos and colors, to display a table around which user avatars are oriented, and to include a video player, as described in more detail with respect to FIG. 5.

An admin can also configure the notification service 150 at stage 355. Configuring the notification service 150 can include configuring notifications to be delivered to the first device 110 notifying the user that access to the VR space 160 has been granted. In another example, the configuration can include configuring notifications to be displayed within the VR space 160. For example, as described with respect to FIG. 4 below, the VR space 160 can be configured to display various notifications to a user through their VR device 120. These can be displayed within the VR space 160 to guide the user or provide helpful information. As an example, a new hire can be greeted with a welcome message and instructions for finding their meeting room. As another example, a notification can be displayed within a VR room 162, 164 to inform users within the room that a meeting will be starting soon or that the meeting has ended and the room will be closing soon.

At stage 360, the notification service 150 can notify the user that access to the VR space 160 has been granted. This can include sending a notification to the user's first device 110, causing the device 110 to display an operating-system-level notification regarding access. In another example, the notification is sent as a text-based message, such as a SMS message. In yet another example, the notification is sent as an email. The notification can also include a link for accessing the VR space 160.

At stage 365, the first device 110 can access the VR space 160. This can include, for example, following a link from the notification provided at stage 360. In some examples, when a user enters the VR space 160 using the first device 110, which is not a VR device, the notification service 150 can generate a notification informing the user that a VR device is required for entry into certain areas of the VR space 160. The user can use the second device 120 to access the VR space at stage 370, such as by putting on a VR headset and following a prompt provided by a notification from the notification service 150.

At stage 375, the notification service 150 can serve VR notifications to the user within the VR space 160. This can include a welcome message, instructions for proceeding to another area of the VR space 160, notifications about rooms opening or closing, or any other relevant information.

Figure 4:
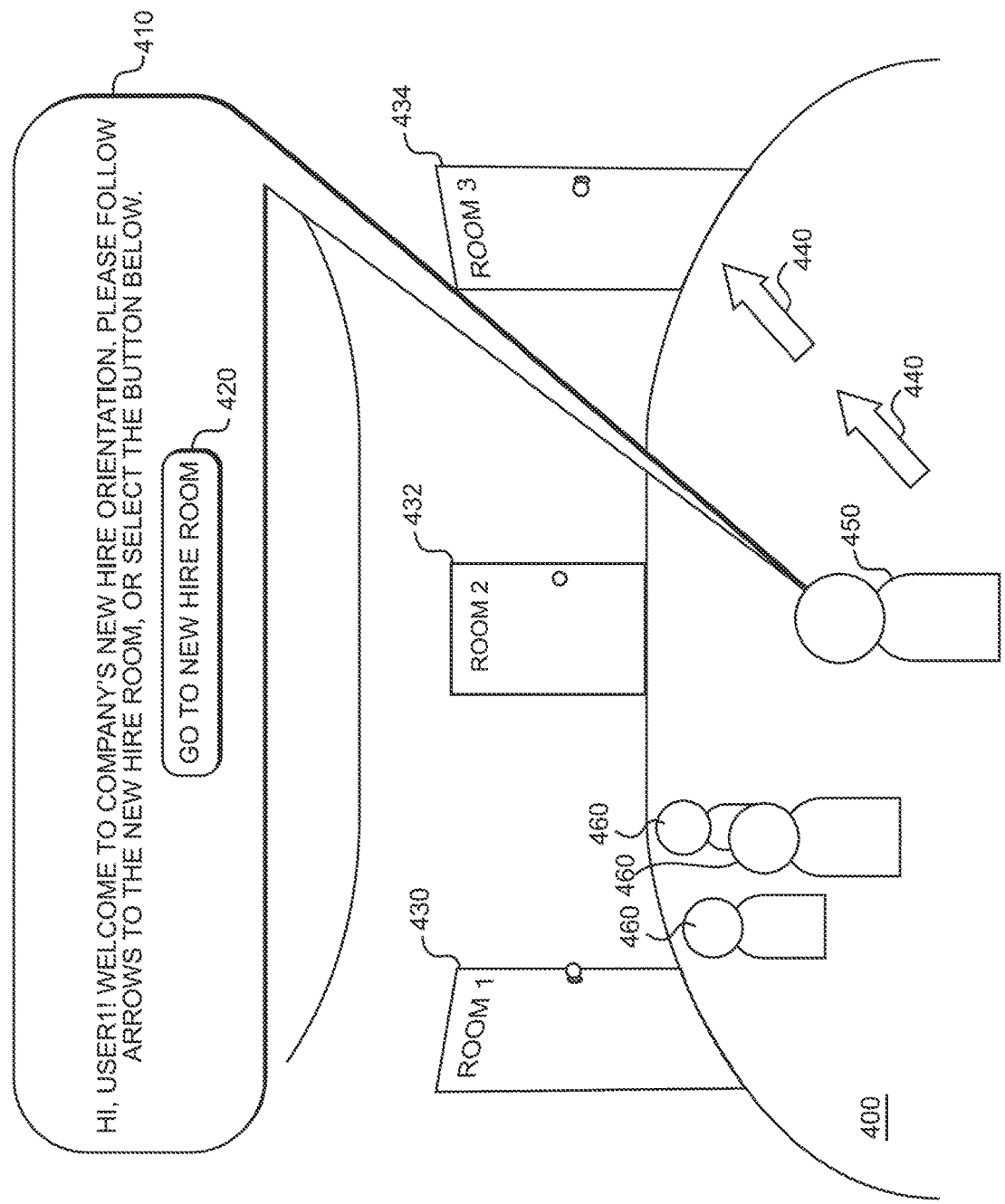
FIG. 4 is an illustration of an example graphical user interface ("GUI") of a managed virtual space that includes a guided notification.

FIG. 4 provides an illustration of an example GUI of a VR space 160 that includes a VR notification 410 generated by the notification service 150, such as a notification served at stage 375 of the method of FIG. 3. As shown, the VR notification 410 welcomes a new user to the company's new hire orientation and informs the user to "please follow arrows to the new hire room, or select the button below." The VR notification 410 then includes a button 420 that the user can select to proceed directly to the new hire room. In this example, the new hire room is VR room 3 434. The VR notification 410 of FIG. 4 is shown as a text bubble originating from an avatar 450. This avatar 450 can be an automatically generated avatar representing an admin, for example.

As some users may prefer to navigate to their room manually, or interact with the VR common area 400 shown in FIG. 4, the user may elect not to use the button 420 and instead proceed with their VR adventure. For example, the user can move their avatar (not shown in first-person view) closer to another avatar 460 and interact with one or more of those avatars 460. For example, the user can use a microphone to speak with the users associated with those avatars 460 or use a keyboard to type a message to those users. The user can also approach any of the VR rooms 430, 432, 434 and attempt to open them. In this example, some VR rooms 430, 432 may be locked to the user based on their status as a new hire—meaning that the digital ID associated with the user is not included on a list for allowing access into these rooms 430, 432.

The VR common area 400 also includes two arrows 440 showing the direct path to the VR room 434 in which the new hire orientation program will take place. These arrows 440 can be generated by the notification service 150, for example. While arrows are shown in FIG. 4, any type of notification can be used, such as a circle around the door to the room 434, a different color for the door, or text placed above the door, for example. Although not shown, the GUI can also include a timer indicating a countdown to a start time for the new hire orientation meeting.

Figure 5:
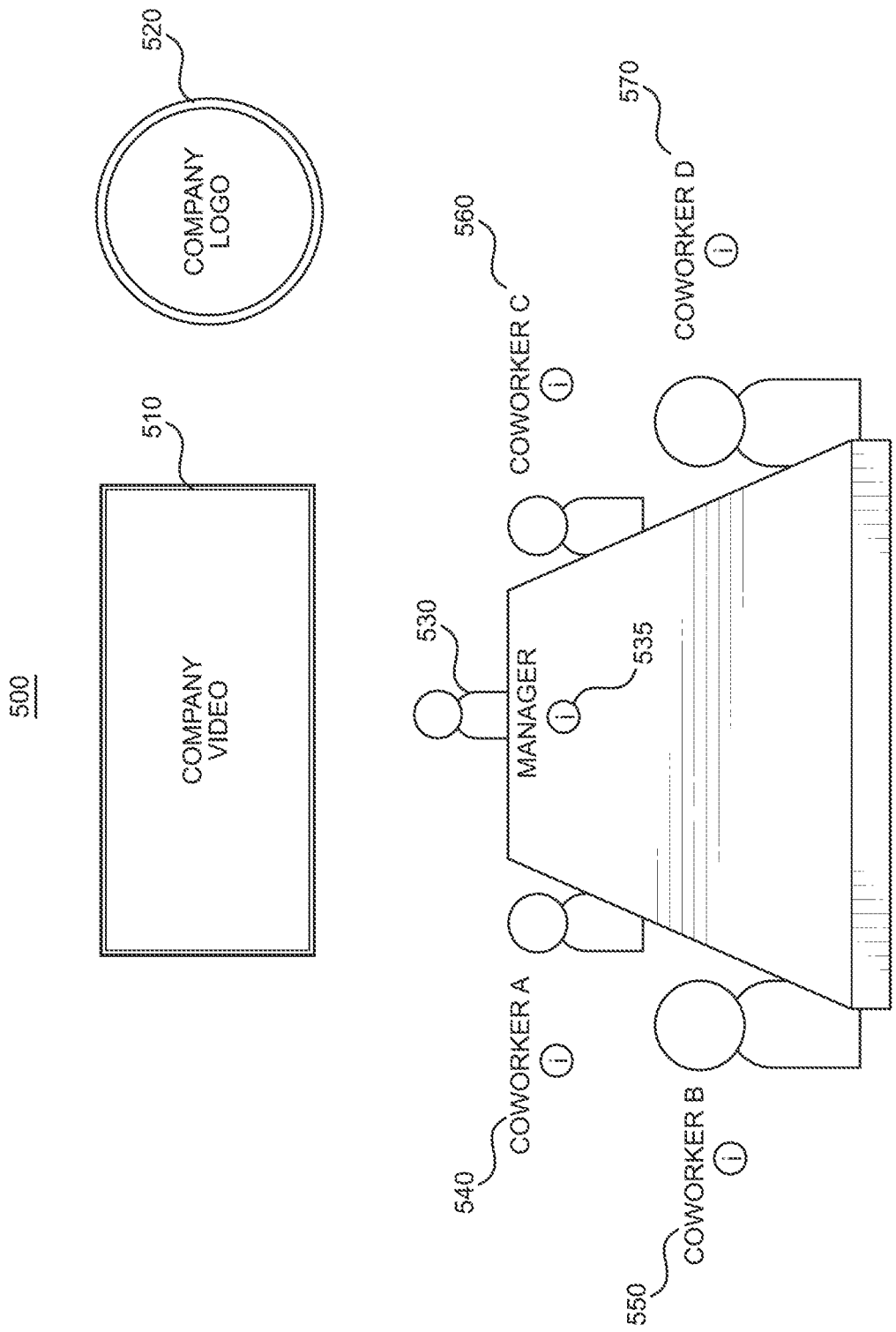
FIG. 5 is an illustration of a second example GUI of a virtual room within a managed virtual space.

The user can enter the room 434, causing the VR device 120 to display a GUI such as the GUI 500 shown in FIG. 5. In this example, an admin has configured the room 434 (such as described above with respect to stage 350 of FIG. 3) to include various features. For example, the room 434 includes a table around which several user avatars 530, 540, 550, 560, 570 are shown. Each of these avatars can correspond to a particular user, and as shown, one manager avatar 530 can correspond to a manager while the remaining user avatars 540, 550, 560, 570 can correspond to coworkers of the user. Information elements 535 are displayed for each user avatar, allowing a user to select for more information about the user, such as their name, department, and contact information.

The GUI 500 of FIG. 5 includes additional elements configured by an admin, such as a video player 510 that can be used to play a company video. This can be useful for a new hire orientation meeting, to standardize the information presented to new hires or particularize the information to a specific department or user group. In some examples, the manager can select a video to be played on the video player 510. The GUI 500 also includes a company logo 520 configured by the administrator. While provided in a simplified view, these configuration features can be configured in a more detailed manner, such as choosing the colors of the floor and walls, lighting within the rooms, and other decorative objects within the room such as plants or artwork.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for managing user interaction within a virtual space, comprising:
   installing a management profile on a first device;
   receiving from the first device, at a server, a request for a digital identifier ("ID") that allows entry into a virtual room of the virtual space;
   authenticating a user of the first device;
   generating the digital ID corresponding to the first device and the user of the first device, wherein the digital ID is unique to the combination of the first device and the user;
   transmitting the digital ID to the first device; and
   configuring the virtual space to allow entry to the virtual room based on the first device providing the digital ID.

2. The method of claim 1, wherein the digital ID also corresponds to a second device of the user, wherein the second device is a virtual-reality device that differs from the first device.

3. The method of claim 2, wherein a profile is installed on the second device based on the user scanning a code on the second device using a camera function of the first device.

4. The method of claim 1, wherein the digital ID is associated with a timer, and wherein the digital ID expires upon expiration of the timer.

5. The method of claim 1, wherein within the virtual space, the digital ID prompts a guided notification prompting the user to enter the at least one virtual room associated with the digital ID.

6. The method of claim 1, wherein configuring the virtual space further comprises configuring the at least one virtual room to allow entry to users belonging to a user group, wherein the users are allowed entry based on their respective digital IDs.

7. The method of claim 1, wherein configuring the virtual space further comprises configuring the at least one virtual room to include enterprise branding.

8. A non-transitory, computer-readable medium containing instructions that, when executed by a hardware-based processor, cause the processor to perform stages for managing user interaction within a virtual space, the stages comprising:
   installing a management profile on a first device;
   receiving from the first device, at a server, a request for a digital identifier ("ID") that allows entry into a virtual room of the virtual space;
   authenticating a user of the first device;
   generating the digital ID corresponding to the first device and the user of the first device, wherein the digital ID is unique to the combination of the first device and the user;
   transmitting the digital ID to the first device; and configuring the virtual space to allow entry to the virtual room based on the first device providing the digital ID.

9. The non-transitory, computer-readable medium of claim 8, wherein the digital ID also corresponds to a second device of the user, wherein the second device is a virtual-reality device that differs from the first device.

10. The non-transitory, computer-readable medium of claim 8, wherein a profile is installed on the second device based on the user scanning a code on the second device using a camera function of the first device.

11. The non-transitory, computer-readable medium of claim 8, wherein the digital ID is associated with a timer, and wherein the digital ID expires upon expiration of the timer.

12. The non-transitory, computer-readable medium of claim 8, wherein within the virtual space, the digital ID prompts a guided notification prompting the user to enter the at least one virtual room associated with the digital ID.

13. The non-transitory, computer-readable medium of claim 8, wherein configuring the virtual space further comprises configuring the at least one virtual room to allow entry to users belonging to a user group, wherein the users are allowed entry based on their respective digital IDs.

14. The non-transitory, computer-readable medium of claim 8, wherein configuring the virtual space further comprises configuring the at least one virtual room to include an interactive virtual object, wherein the interactive virtual object is configured to require the digital ID for access.

15. A system for managing user interaction within a virtual space, comprising:
- a memory storage including a non-transitory, computer-readable medium comprising instructions; and
- a computing device including a hardware-based processor that executes the instructions to carry out stages comprising:
  - installing a management profile on a first device;
  - receiving from the first device, at a server, a request for a digital identifier ("ID") that allows entry into a virtual room of the virtual space;
  - authenticating a user of the first device;
  - generating the digital ID corresponding to the first device and the user of the first device, wherein the digital ID is unique to the combination of the first device and the user;
  - transmitting the digital ID to the first device; and
  - configuring the virtual space to allow entry to the virtual room based on the first device providing the digital ID.

16. The system of claim 15, wherein the digital ID also corresponds to a second device of the user, wherein the second device is a virtual-reality device that differs from the first device.

17. The system of claim 15, wherein a profile is installed on the second device based on the user scanning a code on the second device using a camera function of the first device.

18. The system of claim 15, wherein the digital ID is associated with a timer, and wherein the digital ID expires upon expiration of the timer.

19. The system of claim 15, wherein within the virtual space, the digital ID prompts a guided notification prompting the user to enter the at least one virtual room associated with the digital ID.

20. The system of claim 15, wherein configuring the virtual space further comprises configuring the at least one virtual room to allow entry to users belonging to a user group, wherein the users are allowed entry based on their respective digital IDs.

\* \* \* \* \*